US009961879B1

(12) United States Patent
Quinn

(10) Patent No.: US 9,961,879 B1
(45) Date of Patent: May 8, 2018

(54) MOTORIZED ANIMAL-GROOMING BRUSH

(71) Applicant: George Quinn, Fort Pierce, FL (US)

(72) Inventor: George Quinn, Fort Pierce, FL (US)

(*) Notice: Subject to any disclaimer, the term of this patent is extended or adjusted under 35 U.S.C. 154(b) by 93 days.

(21) Appl. No.: 15/237,678

(22) Filed: Aug. 16, 2016

(51) Int. Cl.
*A01K 13/00* (2006.01)
*A46B 13/02* (2006.01)
*A46B 5/00* (2006.01)

(52) U.S. Cl.
CPC .......... *A01K 13/002* (2013.01); *A46B 5/0095* (2013.01); *A46B 13/02* (2013.01)

(58) Field of Classification Search
USPC ....... 119/600, 608, 609, 664, 652; D30/158, D30/159
See application file for complete search history.

(56) References Cited

U.S. PATENT DOCUMENTS

| 157,798 | A | * | 12/1874 | Davis | A61C 17/26 15/23 |
| 749,727 | A | * | 1/1904 | Fredericks | A46B 7/10 119/608 |
| 909,235 | A | * | 1/1909 | Schror | B08B 7/024 119/609 |
| 1,394,636 | A | * | 10/1921 | Murray | A46B 13/02 15/23 |
| 1,833,967 | A | * | 12/1931 | Groff, Jr. | A61C 17/26 15/23 |
| 2,215,031 | A | * | 9/1940 | Elmore | A61C 17/26 15/28 |
| 2,753,583 | A | * | 7/1956 | Jepson | A01K 13/002 119/609 |
| 2,959,797 | A | * | 11/1960 | Harman | A22C 17/08 15/23 |
| 4,215,601 | A | * | 8/1980 | Mann | B25B 27/00 81/57.13 |
| D262,670 | S | | 1/1982 | Wellin | |
| 5,235,937 | A | * | 8/1993 | Farina | A01J 7/04 119/14.01 |
| 5,794,296 | A | * | 8/1998 | Wong | A61C 17/26 15/22.1 |
| 5,926,972 | A | | 7/1999 | DiPeso | |
| 6,041,462 | A | * | 3/2000 | Marques | A46B 13/008 134/140 |
| 6,324,713 | B1 | | 12/2001 | Barkley | |
| 6,636,697 | B2 | * | 10/2003 | Smith | G03B 17/08 396/26 |
| 6,730,051 | B2 | * | 5/2004 | Lin | A61H 9/0071 15/29 |

(Continued)

FOREIGN PATENT DOCUMENTS

WO 2013176596 A1 11/2013

*Primary Examiner* — Andrea Valenti

(57) ABSTRACT

The motorized animal-grooming brush is adapted for use with animals. The motorized animal-grooming brush is a rotating brush that is driven by an electric drive that is separated in distance from the rotating brush. The motorized animal-grooming brush comprises a brush device, an electric drive, and a drive line. The electric drive provides a motive force through the drive line to the brush device. The brush device receives the motive force from the electric drive and uses this motive force to rotate the grooming brush. The separation by distance between the electric drive and the rotating brush reduces the level of noise heard by the animal.

4 Claims, 7 Drawing Sheets

(56) References Cited

U.S. PATENT DOCUMENTS

| | | | |
|---|---|---|---|
| 8,006,648 B1* | 8/2011 | Sourwine | A01K 13/002 119/609 |
| 9,004,009 B2 | 4/2015 | Kissel, Jr. | |
| 2015/0150217 A1 | 6/2015 | Van Der Poel | |

* cited by examiner

MOTORIZED ANIMAL-GROOMING BRUSH

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of animal husbandry and the grooming and care of animals, more specifically, motorized brush.

The grooming of animals is a labor-intensive process. For many animals, the brushing of fur and hair is an especially important but time consuming task. While the use of motorized brushes can reduce the time required for the brushing of fur and hair, the noise generated by the motor driving the brush can make the animal being groomed skittish and uncooperative.

SUMMARY OF INVENTION

Clearly, an ideal solution would be a mechanically powered brush that is not driven by a local motor and would therefore be quieter than current alternatives. Such a device is disclosed in this application. The motorized animal-grooming brush is adapted for use with animals. The motorized animal-grooming brush is a rotating brush that is driven by an electric drive that is separated by a distance from the rotating brush. The motorized animal-grooming brush comprises a brush device, an electric drive, and a drive line. The electric drive provides a motive force through the drive line to the brush device. The brush device receives the motive force from the electric drive and uses this motive force to rotate the grooming brush. The separation by distance between the electric drive and the rotating brush reduces the level of noise heard by the animal.

These together with additional objects, features and advantages of the motorized animal-grooming brush will be readily apparent to those of ordinary skill in the art upon reading the following detailed description of the presently preferred, but nonetheless illustrative, embodiments when taken in conjunction with the accompanying drawings.

In this respect, before explaining the current embodiments of the motorized animal-grooming brush in detail, it is to be understood that the motorized animal-grooming brush is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the motorized animal-grooming brush.

It is therefore important that the claims be regarded as including such equivalent construction insofar as they do not depart from the spirit and scope of the motorized animal-grooming brush. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
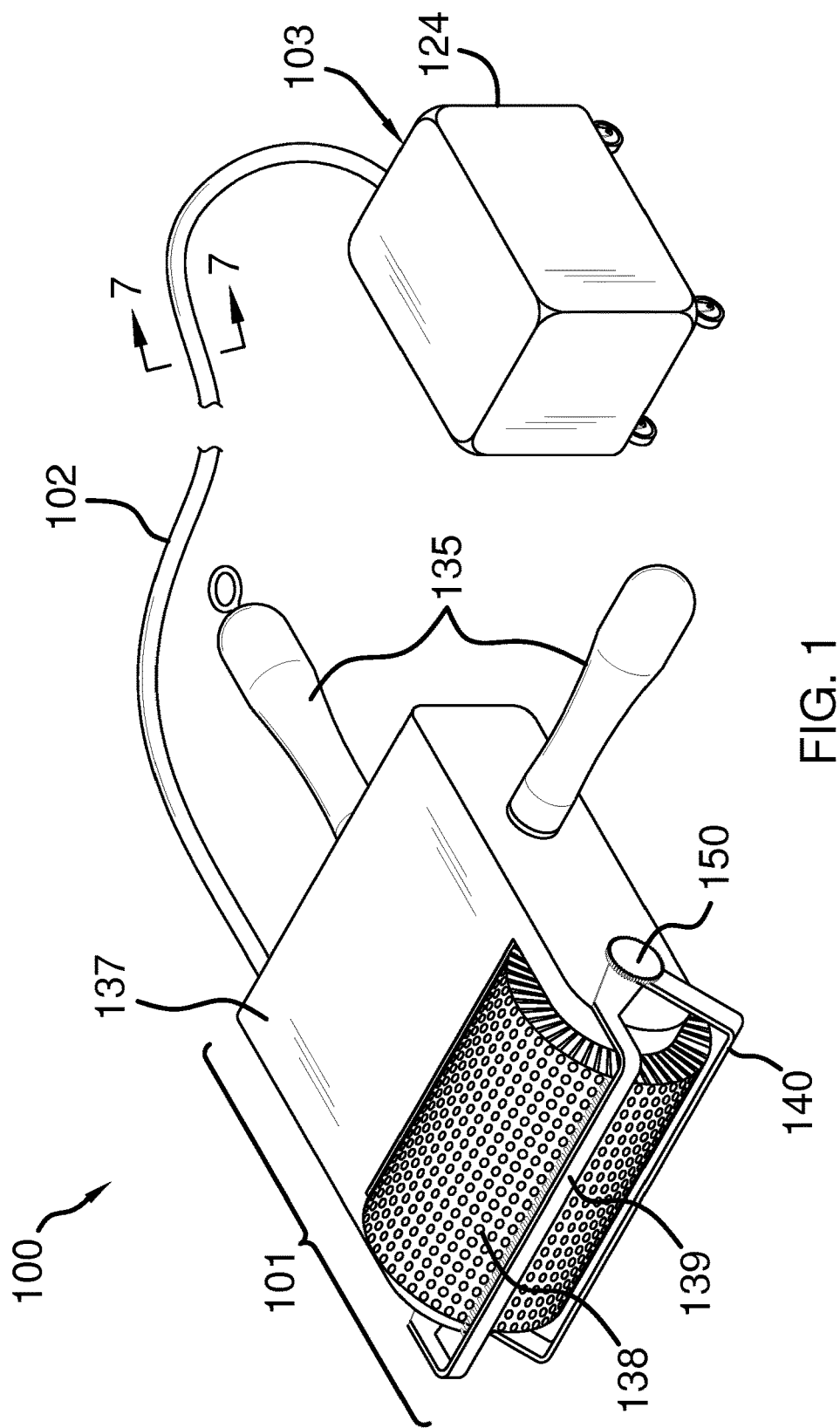
FIG. 1 is a perspective view of an embodiment of the disclosure.
Figure 2:
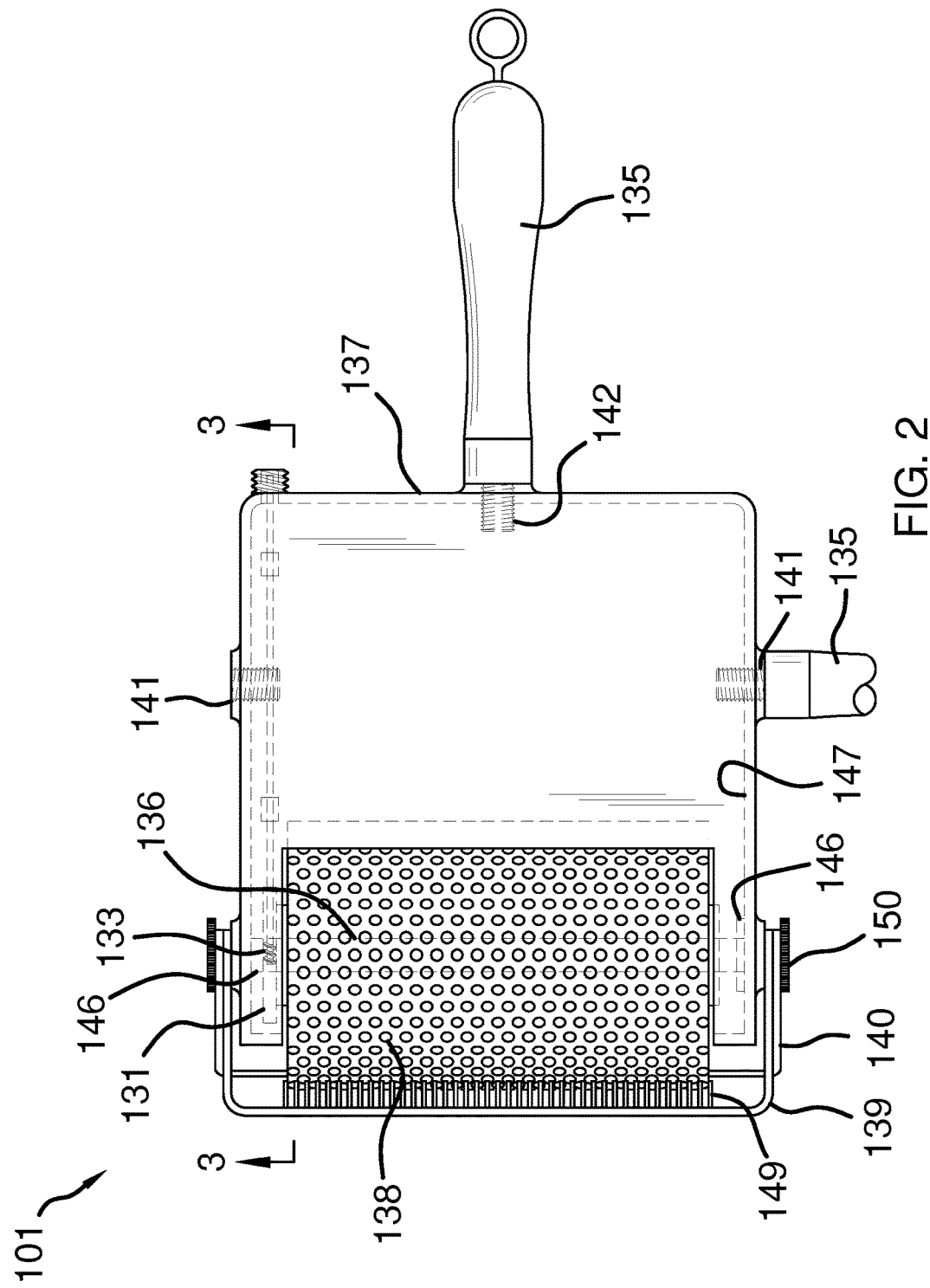
FIG. 2 is a top view of an embodiment of the disclosure.
Figure 3:
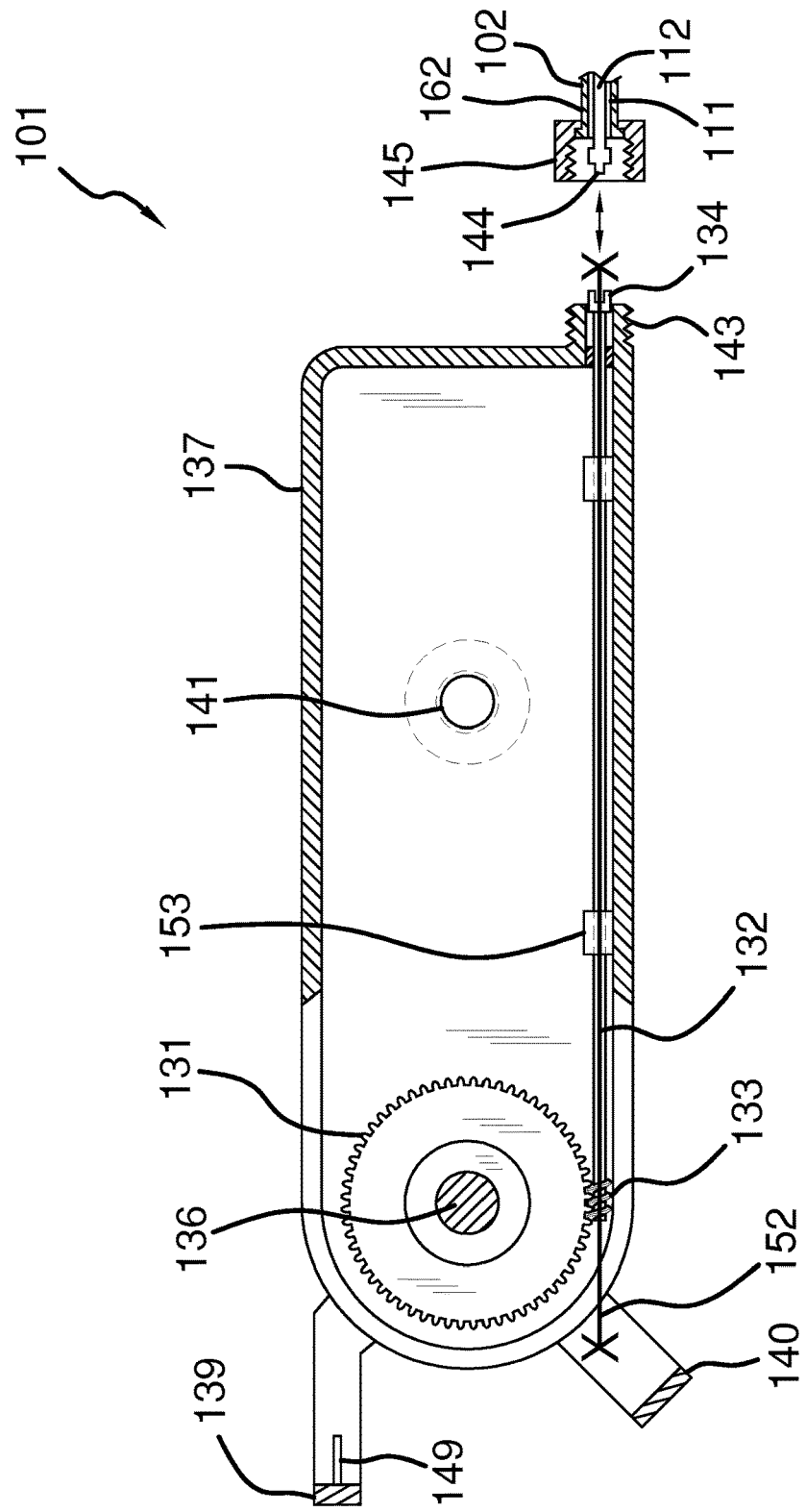
FIG. 3 is a cross-sectional view of an embodiment of the disclosure along line 3-3 in FIG. 2.
Figure 4:
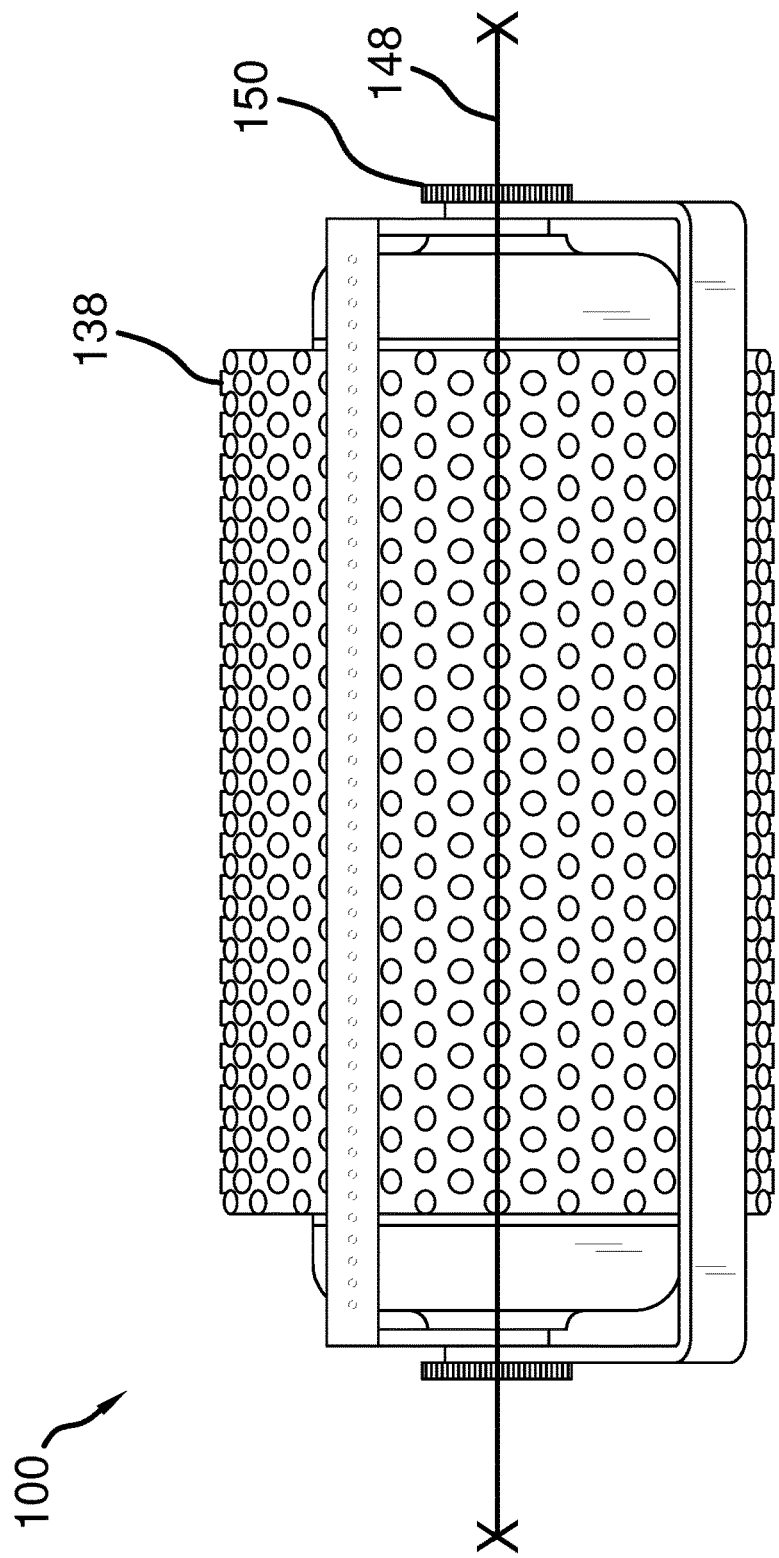
FIG. 4 is a front view of an embodiment of the disclosure.
Figure 5:
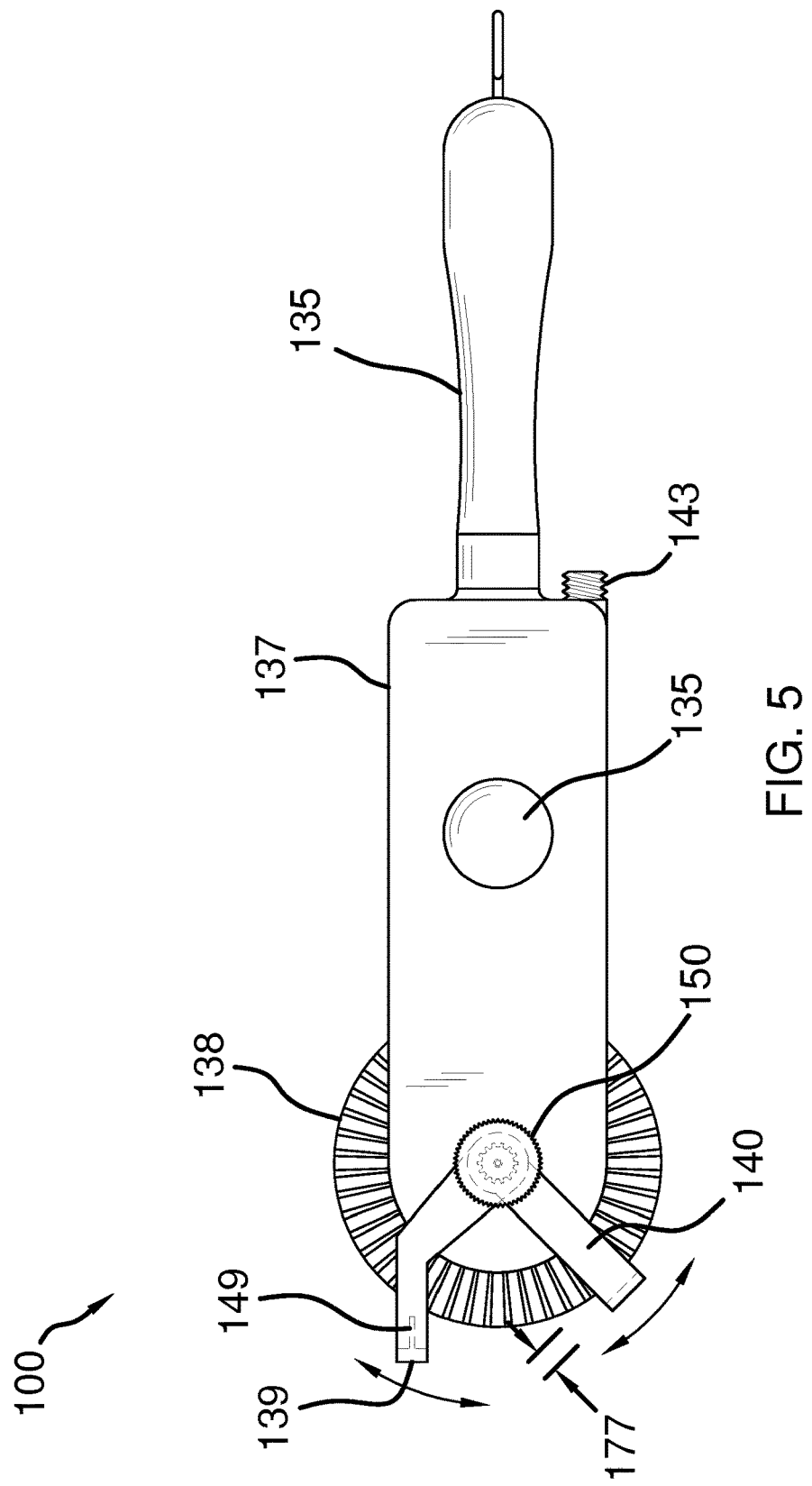
FIG. 5 is another side view of an embodiment of the disclosure.
Figure 6:
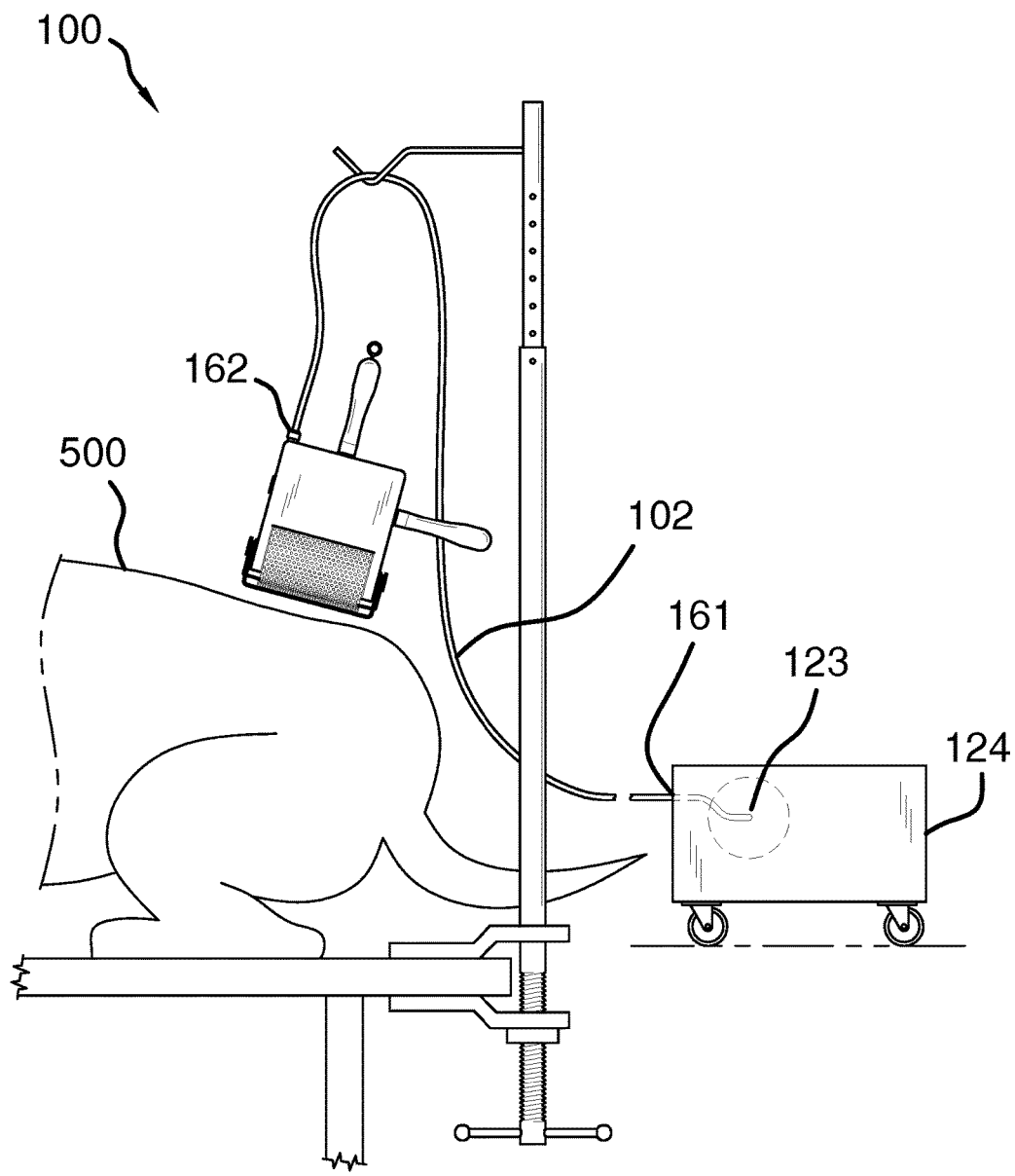
FIG. 6 is a view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 8.

The motorized animal-grooming brush 100 (hereinafter invention) comprises a brush device 101, an electric drive 103, and a drive line 102. The invention 100 is adapted for use with animals 500. The invention 100 is a rotating brush 138 that is driven by the electric drive 103, which is separated by a distance from the brush device 101. The electric drive 103 provides a motive force through the drive line 102 to the brush device 101. The brush device 101 receives the motive force from the electric drive 103 and uses this motive force to rotate a grooming brush called a rotating brush 138. The separation by distance between the electric drive 103 and the brush device 101 reduces the level of noise heard by an animal 500.

The drive line 102 further comprises a conduit 111 and a cable 112. The cable 112 is further defined with a first end 161 and a second end 162. The cable 112 is a commercially available wire cable that is used to transmit the motive force between the electric drive 103 and the brush device 101. The conduit 111 is used as a sheath to cover the cable 112. Conduit 111 is used as a sheath in this disclosure because the flexibility of conduit 111 allows the conduit 111 to be bent such that the drive line 102 can be moved out of the way during grooming activities. Once the conduit 111 is bent and moved into position, the conduit 111 displays adequate stiffness that the tension on the cable 112 can be maintained as the invention 100 is operated.

Figure 8:
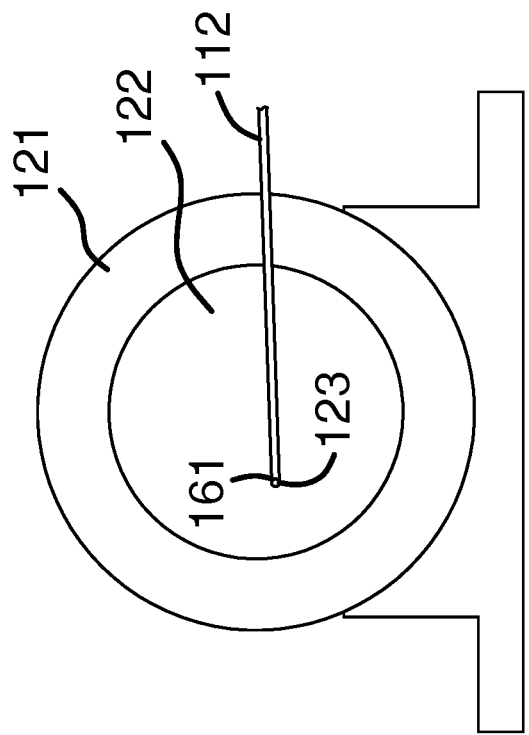
FIG. 8 is a view of an embodiment of the disclosure
Figure 7:
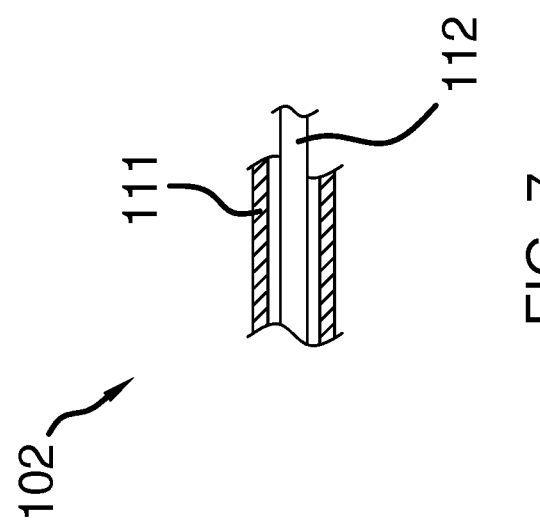
FIG. 7 is a cross-sectional view of the drive line of an embodiment of the disclosure along line 7-7 in FIG. 1.

The electric drive 103 further comprises an electric motor 121, a first offset disk 122, a first connector 123, and a first housing 124 (see FIG. 8). The electric motor 121 is a commercially available electric motor. The first offset disk 122 is attached to the cylindrical axle of the electric motor 121 such that the center axis of the axle of the electric motor 121 is aligned with the center axis of the first offset disk 122. The first connector 123 is attached to the first offset disk 122 such that the first connector 123 is not aligned with the center axis of the first offset disk 122. This arrangement results in the first connector 123 tracing an elliptical path during the rotation of the first offset disk 122. The electric motor 121, the first offset disk 122 and the first connector 123 are contained within the first housing 124. The first housing 124 is a rigid casing. The first end 161 of the cable 112 is inserted through a hole formed in the housing 124 and attached to the first connector 123. The conduit 111 is attached to the first housing 124 such that the motion of the cable 112 is shielded from the operator.

The brush device 101 further comprises a worm gear 131, a worm shaft 132, a worm 133, a worm shaft receiver 134, at least one handle 135, an axle 136, a housing 137, a rotating brush 138. The rotating brush 138 further comprises a brush armature 139 and a second armature 140.

The housing 137 is generally box shaped, and is further defined with threaded handle ports 141 that enable the at least one handle 135 to be threadably coupled thereto. The at least one handle 135 includes a threaded member 142 that is able to screw to the threaded handle ports 141 of the housing 137. The housing 137 is of hollowed construction, and includes a worm port 143 from which the worm shaft receiver 134 is located. The worm shaft receiver 134 interacts with a drive shaft gear 144 of the drive line 102 in order to provide mechanical connectivity between the drive line 102 and the brush device 101. The worm port 143 includes external threading that corresponds with a drive connector 145 of the drive line 102. The drive connector 145 is provided at the second end 162 of the drive line 102.

The worm 133 is provided on the worm shaft 132. Moreover, the worm 133 is distal of the worm shaft receiver 134. The worm shaft 132 rotates about a worm axis 152. Worm bearings 153 enable rotation of the worm shaft 132 within the housing 137. The worm 133 interfaces with the worm gear 131 in order to rotate the axle 131, and in turn rotate the rotating brush 138. The axle 131 is mounted between bearing members 146 provided along an inner surface members 146 enable rotational movement of the axle 131 along a drive axis 148.

The second armature 140 and the brush armature 139 worm in concert with the rotating brush 138. The rotating brush 138 rotates relative to the drive axis 148. Moreover, the brush armature 139 includes detangling members 149 that work to expel loose debris associated with grooming of the animal 500. Both the brush armature 139 and the second armature 140 are generally parallel with one another, and with the rotating brush 138. The second armature 140 works as a guide to insure that the rotating brush 138 maintains an elevation 177 with respect to the animal 500 when in use. Both the brush armature 139 and the second armature 140 are able to rotate with respect to the housing 137 and the rotating brush 138 via knobs 150.

The first housing 124 and the second housing 137 are formed from molded plastic. Suitable plastics include, but are not limited to, high density polyethylene or poly(methyl methacrylic). The remaining components described in this disclosure are commercially available.

The following definitions were used in this disclosure:

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Center Axis: As used in this disclosure, the center axis is the axis of a cylinder like structure. When the center axes of two cylinder like structures share the same line they are said to be aligned. When the center axes of two cylinder like structures do not share the same line they are said to be offset.

Cylinder: As used in this disclosure, a cylinder is a geometric solid defined by two identical flat and parallel ends that are circular in shape and connected with a single curved surface wherein when the cross section of the cylinder remains the same from one end to another. The axis of the cylinder is formed by the straight line that connects the center of each of the two identical flat and parallel ends of the cylinder. In this disclosure, the term cylinder specifically means a right cylinder, which is defined as a cylinder wherein the curved surface perpendicularly intersects with the two identical flat and parallel ends.

Disk: As used in this disclosure, a disk is a cylindrically shaped object that is flat is appearance.

Drive: As used in this disclosure, a drive is a mechanism or a device that transmits a motive force from a first device or object to a second device or object with the objective or operating the second object.

Electric Motor: In this disclosure, an electric motor is a machine that converts electric energy into rotational mechanical energy.

Handheld: As used in this disclosure, when referring to an item or device, handheld means that the item or device is small and light enough to be operated while a person holds the item or device in their hands.

Motor: As used in this disclosure, a motor refers to the method of transferring energy from the external power source into mechanical energy.

Ratchet: As used in this disclosure, a ratchet is a device comprising a pawl or hinged catch that engages the sloping teeth of a wheel or bar permitting motion in one direction only.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A grooming device comprising:
a brush device, an electric drive, and a drive line;
wherein the grooming device is adapted for use with animals;
wherein the grooming device is a rotating brush that is driven by the electric drive;
wherein the electric drive is separated from the brush device via a distance;
wherein the electric drive provides a motive force through the drive line to the brush device;
wherein the brush device receives the motive force from the electric drive and uses this motive force to rotate the rotating brush;
wherein the drive line further comprises a conduit and a cable;
wherein the cable is further defined with a first end and a second end;
wherein the cable transmits the motive force between the electric drive and the brush device;
wherein the electric drive further comprises an electric motor, a first offset disk, a first connector, and a first housing;
wherein the first offset disk is attached to the cylindrical axle of the electric motor such that the center axis of the axle of the electric motor is aligned with the center axis of the first offset disk;
wherein the first connector is attached to the first offset disk such that the first connector is not aligned with the center axis of the first offset disk;
wherein the electric motor, the first offset disk and the first connector are contained within the first housing;
wherein the first housing is a rigid casing;
wherein the first end of the cable is inserted through a hole formed in the housing and attached to the first connector;
wherein the conduit is attached to the first housing such that the motion of the cable is shielded;
wherein the brush device is further comprised of a worm gear, a worm shaft, a worm, a worm shaft receiver, at least one handle, an axle, a housing, and a rotating brush;
wherein the housing is of hollowed construction, and includes a worm port from which the worm shaft receiver is located;
wherein the rotating brush includes a brush armature and a second armature;
wherein the housing is generally box shaped, and is further defined with threaded handle ports that enable the at least one handle to be threadably coupled thereto;
wherein the at least one handle includes a threaded member that is able to screw to the threaded handle ports of the housing;
wherein the worm shaft receiver interacts with a drive shaft gear of the drive line in order to provide mechanical connectivity between the drive line and the brush device;
wherein the worm port includes external threading that corresponds with a drive connector of the drive line;
wherein the drive connector is provided at the second end of the drive line;
wherein the worm is provided on the worm shaft;
wherein the worm is distal of the worm shaft receiver;
wherein the worm shaft rotates about a worm axis;
wherein worm bearings enable rotation of the worm shaft within the housing;
wherein the worm interfaces with the worm gear in order to rotate the axle, and in turn rotate the rotating brush;
wherein the axle is mounted between bearing members provided along an inner surface of the housing;
wherein the bearing members enable rotational movement of the axle along a drive axis;
wherein the second armature and the brush armature work in concert with the rotating brush;
wherein the rotating brush rotates relative to the drive axis;
wherein the brush armature includes detangling members that work to expel loose debris associated with grooming of the animal.

2. The grooming device according to claim 1 wherein both the brush armature and the second armature are generally parallel with one another, and with the rotating brush.

3. The grooming device according to claim 2 wherein the second armature works as a guide to insure that the rotating brush maintains an elevation with respect to the animal when in use.

4. The grooming device according to claim 3 wherein both the brush armature and the second armature are able to rotate and lock at varying locales with respect to the housing and the rotating brush via knobs.

* * * * *